(12) United States Patent
Mirbach et al.

(10) Patent No.: US 11,263,765 B2
(45) Date of Patent: Mar. 1, 2022

(54) METHOD FOR CORRECTED DEPTH MEASUREMENT WITH A TIME-OF-FLIGHT CAMERA USING AMPLITUDE-MODULATED CONTINUOUS LIGHT

(71) Applicant: IEE INTERNATIONAL ELECTRONICS & ENGINEERING S.A., Echternach (LU)

(72) Inventors: Bruno Mirbach, Konz (DE); Harald Clos, Saarbrücken (DE); Martin Boguslawski, Trier (DE); Thomas Solignac, Luttange (FR)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 17/311,225

(22) PCT Filed: Dec. 3, 2019

(86) PCT No.: PCT/EP2019/083538
§ 371 (c)(1),
(2) Date: Jun. 4, 2021

(87) PCT Pub. No.: WO2020/115068
PCT Pub. Date: Jun. 11, 2020

(65) Prior Publication Data
US 2021/0358148 A1    Nov. 18, 2021

(30) Foreign Application Priority Data

Dec. 4, 2018 (LU) ........................................ 101024
Feb. 12, 2019 (LU) ........................................ 101120

(51) Int. Cl.
*G06K 9/00*    (2006.01)
*G06T 7/521*    (2017.01)
(Continued)

(52) U.S. Cl.
CPC .............. *G06T 7/521* (2017.01); *G01S 7/491* (2013.01); *G01S 17/894* (2020.01); *G06T 7/80* (2017.01); *G06T 2207/10028* (2013.01)

(58) Field of Classification Search
CPC . G06T 7/521; G06T 7/80; G06T 2207/10028; G01S 7/491; G01S 17/894;
(Continued)

(56) References Cited

U.S. PATENT DOCUMENTS 7,884,310 B2 * 2/2011 Buettgen ........... H01L 31/02005
250/208.1
9,442,196 B2 * 9/2016 Buettgen ............... G01S 7/4918
(Continued)

FOREIGN PATENT DOCUMENTS

| GB | 2539495 A | * 12/2016 | ........... G01S 7/4802 |
| WO | WO-2015086663 A1 | * 6/2015 | ........... G01S 7/4863 |
| WO | 2015156684 A2 | 10/2015 | |

OTHER PUBLICATIONS

Andrew D. Payne et al., "Improved Measurement Linearity and Precision for AMCW Time-of-Flight Range Imaging Cameras", Applied Optics, Optical Society of America, vol. 49, No. 23, Aug. 1, 2010, pp. 4392-4403.
(Continued)

*Primary Examiner* — Mahendra R Patel
(74) *Attorney, Agent, or Firm* — Reising Ethington P.C.

(57) ABSTRACT

A method for corrected depth measurement with a time-of-flight camera using amplitude-modulated continuous light. In order to enable an accurate and efficient depth measurement with a time-of-flight camera, the method includes, for each of a plurality of pixels of a sensor array of the camera: acquiring with the camera a raw depth value $r_m$ for the pixel; and automatically calculating a ground truth value $r_t$ according to: $r_t = g(r_m - c_m) + c_t$, to correct a systematic depth error of the raw depth value $r_m$, wherein $c_m$ is a pixel-dependent first
(Continued)

offset, g is a pixel-independent first function and $c_t$ is a pixel-independent second offset.

20 Claims, 2 Drawing Sheets

(51) Int. Cl.
*G06T 7/80* (2017.01)
*G01S 17/894* (2020.01)
*G01S 7/491* (2020.01)

(58) Field of Classification Search
CPC ... G01B 1/10; G01C 1/00; G02B 1/00; G02B 2207/00
USPC .......................................................... 382/106
See application file for complete search history.

(56) References Cited

U.S. PATENT DOCUMENTS

| | | | | |
|---|---|---|---|---|
| 9,864,048 | B2* | 1/2018 | Hall | G01S 7/4915 |
| 9,906,717 | B1* | 2/2018 | Plank | G06T 7/50 |
| 10,382,736 | B1* | 8/2019 | Thurner | G01S 7/4914 |
| 10,928,489 | B2* | 2/2021 | Xu | G01S 17/36 |
| 11,002,854 | B2* | 5/2021 | Weber | G01S 7/486 |
| 2007/0222984 | A1* | 9/2007 | Palumbo | G01N 21/532 |
| | | | | 356/338 |
| 2010/0268516 | A1* | 10/2010 | Payne | H03K 4/026 |
| | | | | 703/2 |
| 2012/0013887 | A1* | 1/2012 | Xu | G01S 7/497 |
| | | | | 356/4.02 |
| 2012/0098964 | A1* | 4/2012 | Oggier | G01S 17/36 |
| | | | | 348/140 |
| 2014/0313376 | A1* | 10/2014 | Van Nieuwenhove | |
| | | | | H04N 5/357 |
| | | | | 348/241 |
| 2015/0156684 | A1* | 6/2015 | LaBauve | H04W 36/0022 |
| | | | | 370/329 |
| 2016/0005179 | A1* | 1/2016 | Petyushko | G06T 5/50 |
| | | | | 382/154 |
| 2017/0205497 | A1* | 7/2017 | Dorrington | G01S 7/497 |
| 2017/0316602 | A1* | 11/2017 | Smirnov | G06T 15/205 |
| 2018/0106891 | A1* | 4/2018 | Thurner | G01S 17/894 |
| 2018/0210070 | A1* | 7/2018 | Bleyer | G01S 17/894 |
| 2019/0154834 | A1* | 5/2019 | Heidrich | G01S 17/89 |
| 2019/0318201 | A1* | 10/2019 | Ahmed | G06T 19/20 |

OTHER PUBLICATIONS

International Search Report corresponding to International Application No. PCT/EP2019/083538, dated Jan. 9, 2020, 4 pages.
Written Opinion corresponding to International Application No. PCT/EP2019/083538, dated Jan. 9, 2020, 5 pages.

* cited by examiner

METHOD FOR CORRECTED DEPTH MEASUREMENT WITH A TIME-OF-FLIGHT CAMERA USING AMPLITUDE-MODULATED CONTINUOUS LIGHT

TECHNICAL FIELD

The invention relates to a method for corrected depth measurement with a time-of-flight camera using amplitude-modulated continuous light.

BACKGROUND

Time-of-flight cameras are used to provide pixelwise depth information in an image of a three-dimensional object or scenery. The camera comprises a (normally two-dimensional) sensor array with a plurality of pixels. Each pixel provides information from which the depth (i.e. the distance from the camera) of a recorded point in space can be derived. Apart from TOF cameras using light pulses, another type of TOF camera uses an amplitude-modulated continuous light. In other words, the camera emits a continuous field of amplitude-modulated light, which is reflected from objects in the field of view of the camera. The reflected light is received by the individual pixels. Due to the amplitude-modulation, the phase of the received light can be deduced from the amplitude and by the relative phase difference the time of flight and thus the distance to the reflecting object can be determined. According to a well-known method, lock-in pixels are employed where the readout of each pixel is synchronised to the modulation frequency of the light. In particular, the readout frequency of each pixel can be 4 times the modulation frequency. This is also referred to as the 4-tap method.

Depth measurement with a ToF camera using amplitude modulated continuous light (AMCL) and lock-in pixels is described well by the homodyne principle. Therein, the modulation frequencies of light and pixel clock equal. The correlation signal of both functions is relevant for the measurement process and subject of the investigation. However, both signals, light modulation and pixel exposure process, are usually non-harmonic—an intermediate state between sinusoidal and square function—wherefore the correlation signal is non-harmonic as well.

Demodulation of a continuously modulated, non-harmonic signal by sampling with a frequency four times higher than the fundamental leads to aliasing effects. In consequence, higher harmonics impurify the reconstructed signal. Hence, compared to the original signal, periodic deviations of the reconstruction occur. Therefore, the "fundamental" frequency of the error is at least four times the initial modulation frequency.

Numerous approaches were developed to correct for the mentioned systematic depth error, the so-called wiggling error. However, approaches so far include also camera-, integration time- or even pixel-wise corrections. This implies that every sample must be individually calibrated in an intricate, highly time-consuming process, which is not appropriate in the production of an industrial time-of-flight camera. In addition, the resulting calibration parameters demand large memory space.

SUMMARY

It is thus an object of the present invention to enable an accurate and efficient depth measurement with a time-of-flight camera.

This problem may be solved by a method according to claim 1.

The invention provides a method for corrected depth measurement with a time-of-flight camera using an amplitude-modulated continuous light. Depth measurement herein of course refers to measuring the distance from the camera, so that a 3D sensor array can be obtained. The principle of a time-of-flight (ToF) camera using amplitude-modulated continuous light is well known as such and has been explained above. While the term "light" may refer to visible light, it will be understood that infrared light or ultraviolet light could be employed as well.

The method comprises the following two steps for each of a plurality of pixels of a sensor array of the camera. The pixels may in particular be lock-in pixels. The sensor array comprises a plurality (normally between several hundred and several thousand) of pixels, usually disposed in a two-dimensional pattern, although a one-dimensional arrangement would be conceivable, too.

In a first step, a raw depth value $r_m$ for the pixel is acquired with the camera. This raw depth value $r_m$ is generally affected by measurement errors and does not represent the actual depth exactly.

In a second step, a ground truth value $r_t$ is automatically calculated according to the following equation:

$$r_t = g(r_m - c_m) + c_t \qquad \text{(eq. 1)}$$

wherein $c_m$ is a pixel-dependent first offset, g is a pixel-independent first function and $c_t$ is a pixel-independent second offset. More specifically, $c_m$ is a first offset for each individual pixel, while the first function g is the same for all pixels and the second offset $c_t$ is the same for all pixels. One can also say that for calculating the ground truth value $r_t$, an individual first offset $c_m$ is used for each individual pixel, while the same first function g is used for all pixels and the same second offset $c_t$ is used for all pixels. It is understood that the first offset $c_m$, the first function g and the second offset $c_t$ are predetermined before the ground truth value $r_t$ is calculated. The automatic calculation is preferably performed by the camera itself. For this purpose, the camera may comprise a volatile memory and/or a non-volatile memory and a processing unit. The processing unit may at least partially be software-implemented. Although the ground truth value $r_t$ may still differ (minimally) from the actual depth, it is generally a sufficiently accurate approximation. One can also say that the ground truth value $r_t$ (at least approximately) represents an actual depth for the respective pixel. The actual depth for a pixel is the actual, physical distance between the respective pixel and the point from where the light received by this pixel is reflected. The ground truth value $r_t$ is calculated to correct a systematic depth error of the raw depth value $r_m$, I.e. the raw depth value $r_m$ has a systematic depth error and by calculating the ground truth value $r_t$, from the raw depth value $r_m$ the systematic depth error is corrected. In other words, a depth correction is performed by calculating the ground truth value $r_t$.

While the sequence of the first and second step is fixed for a specific pixel, there are various possibilities in which order the steps may be performed for different pixels. For example, the first step could be performed sequentially for all pixels in the sensor array, the raw depth values $r_m$ could be stored in a (volatile) memory and the ground truth values $r_t$ could be calculated subsequently for all pixels. Another possibility would be to calculate the ground truth value $r_t$ for each pixel before the raw depth value $r_m$ for the next pixel is acquired. Although this approach would help to minimise the memory space, it could slow down the recording of a 3D image and thus could be unsuitable if rapid changes in the 3D image occur. Another possibility would be that the first and second step are performed in parallel, i.e. the ground truth value $r_t$ for at least one pixel can be calculated while the raw depth value $r_m$ for at least one pixel is being acquired.

When looking at eq. 1, it becomes clear that calculation of the ground truth value $r_t$ is relatively simple. It requires the following three steps:
1) Subtracting the pixel-dependent first offset $c_m$;
2) Applying the pixel-independent first function g; and
3) Adding the pixel-independent second offset $c_t$.

These calculations can be done in real-time, e.g. after acquisition of each depth sensor array frame. The only necessary input are the pixels of the sensor array. It should be noted that the first and third step are simple additions or subtractions, respectively. Also, the third step is an addition of a single value that is the same for all pixels. Likewise, the second step requires application of a first function g that is the same for all pixels. Therefore, the only step that requires a memory space proportional to the size of the sensor array is the first step, which requires memory for the first offset $c_m$ for each individual pixel. However, borne in mind that for each pixel only one or a few bytes are necessary, the memory space needed for the first offset corresponds to just one depth image and the total required memory for the first offset $c_m$ is comparatively small.

Therefore, the inventive method enables an effective depth correction for a ToF camera without the need for any additional devices, large memory space or extensive processing power.

Although the invention is not limited to this, acquiring the raw depth value $r_m$ normally comprises determining four amplitude samples at a sampling frequency four times higher than a modulation frequency of the amplitude-modulated continuous light. This may also be referred to as a 4-tap method, wherein the four amplitudes $A_{0\ldots3}$, referred to as taps, are the base for the phase retrieval of the modulated light, since the phase $\varphi$ can be calculated as.

$$\varphi = \operatorname{atan}\left(\frac{A_0 - A_2}{A_1 - A_3}\right). \qquad \text{(eq. 2)}$$

The correlation function between the light amplitude and the pixel clock is sampled four times per fundamental period with equally delayed sampling points. Thus, the sampling frequency is four times higher than the fundamental modulation frequency. According to the Shannon-Nyquist theorem, aliasing can only occur for harmonics with an order greater than two. Thus, amplitude and phase of the fundamental frequency are distorted by all higher harmonic frequencies, naturally of odd order.

In some cases, the function values of the first function g could be calculated in real time. In other cases, it may be desirable to save processing effort or the analytic form of the first function g may even be unknown. For these and other reasons, it is preferred that the first function g is applied by accessing a look-up table representing the first function g. The required memory space for the look-up table can be relatively small. By way of example, the look-up table can be represented by a one-dimensional vector requiring a memory space between several kB and several 10 kB (e.g. with one entry per mm, this would be approx. 15 kB for a modulation frequency of 20 MHz).

Usually, the analytic form of the first function g is complicated or even unknown. However, for creating the look-up table it is sufficient to note the inverse function. Usually, the look-up table is calculated by applying a second function $f$, which is the inverse function of the first function g. It is clear that the look-up table represents the second function as well as the first function g, while a specific entry of the look-up table represents a function value for the first function g and an argument for the second function, and vice versa. It is understood that eq. 1 can be rewritten as $$r_m = c_m + f(r_t - c_t), \qquad \text{(eq. 3)}$$

wherein the second function $f(x)$ resembles the wiggling model function with the ground truth value $r_t$ as the input, shifted by the second offset $c_t$. From the theoretical standpoint, eq. 1 is actually derived from equation eq. 3. Physically, the first and second offset $c_m$, $c_t$ may consider temporal delay times of sensor array exposure or LED control to the internal device clock. As mentioned above, the second offset $c_t$ is pixel-independent but may optionally be temperature-dependent. Normally, a temperature dependency of the second offset $c_t$ has to be taken into account or should be taken into account for optimum results. However, the invention is not limited to this and there may be scenarios where the second offset $c_t$ can be treated (or modeled) as temperature-independent. This is to be understood in the sense that eq. 1 and eq. 3 represent a mathematical model that is an approximation of the actual, physical relation between $r_m$ and $r_t$. This actual relation always includes a temperature dependency that can be approximated in various ways, the most simple way being to assume that the second offset $c_t$ is temperature-independent for a certain temperature range. The first offset $c_m$ is pixel-dependent but temperature-independent. It can be interpreted as a depth non-uniformity (DNU). The separation of this non-uniformity $c_m$ and of the temperature-dependent second offset $c_t$ results in a wiggling model function $f$ that is not pixel-dependent or temperature-dependent. The same of course applies to the first function g, which is the inverse function of the second function $f$. In other words, if a temperature dependency is taken into account in eq. 1 and eq. 3, the wiggling model function, the first function g and the first offset $c_m$ are temperature-independent while the second offset $c_t$ is temperature-dependent. This has considerable advantages e.g. during a production end test, as will become clearer below.

The specific form of the second function $f$ is not limited within the scope of the invention. It may depend e.g. on theoretical considerations, the desired accuracy and possible limitations regarding processing power or memory space, although the latter two are usually not relevant. For a second function $f$ that does not consider wiggling errors, an optional offset term and a linear term are sufficient. Including wiggling, oscillatory terms can be included in the second function $f$. If the above described 4-tap method is applied, it follows from the Shannon-Nyquist theorem that only aliasing of harmonics with an order greater than two can occur. Mostly it is sufficient to consider aliasing by third and fifth harmonic order, while higher-order contributions (seventh harmonic order etc.) can be neglected. Therefore, the second function $f$ may comprise a linear term, a third order harmonic term and a fifth order harmonic term with respect to the modulation frequency. The third order harmonic term has a frequency four times higher than the modulation frequency and the fifth order harmonic term has a frequency eight times higher than the modulation frequency. In this embodiment, the second function $f$ can be written as follows (with $r_t - c_t = r$):

$$f(r) = a_0 + r + a_1\cos(k_4 r) + a_2\sin(k_4 r) + \quad \text{(eq. 4)}$$
$$a_3\cos(k_8 r) + a_4\sin(k_8 r) + \cdots$$
$$= a_0 + r + b_1\cos(k_4 r + \theta_1) +$$
$$b_2\cos(k_8 r + \theta_2) + \cdots$$

with $$k_n = n\frac{4\pi v_{ill}}{c}, \quad n = 4, 8$$

$$b_1 = \sqrt{a_1^2 + a_2^2}$$

$$\theta_1 = \arctan\left(\frac{a_1}{a_2}\right)$$

and $b_2$, $\theta_2$ accordingly for $k_8$ terms, with $v_{ill}$ being the modulation frequency. The coefficients of the second function $f$ can be found e.g. by linear regression with the raw depth values $r_m$ and the ground truth values $r_t$ as input. This can be done during a calibration that is explained below.

Before the corrected depth measurement, a calibration can be performed for the camera, in which at least one of the first offset $c_m$, the first function g and the second offset $c_t$ is determined. "Before the corrected depth measurement" is not to be understood in any way limiting regarding the time interval between the calibration and the corrected depth measurement. Normally, the calibration is performed in the course of the production of the camera or immediately afterwards, while the (first) corrected depth measurement may be initiated by an end-user. However, this corrected depth measurement could also be performed in a testing process of the camera after its production. While it is understood that the first offset $c_m$, the first function g and the second offset $c_t$ need to be determined somehow, the calibration process for a specific camera, i.e. a specific sample, may only comprise determining one or two of these quantities. "Determining" may refer to defining the respective quantity as well as to obtaining the quantity by calculation and/or measurement.

The first offset $c_m$ and/or the first function g can usually be assumed to be the same for all cameras of a given type or production series. Therefore, they do not need to be determined for each individual camera. Preferably, the calibration comprises a general calibration, in which at least one of the first offset $c_m$ and/or the first function g is determined only once for a plurality of cameras. In other words, the first offset $c_m$ and/or the first function g is determined in the general calibration once using a single camera and afterwards, the results of this general calibration can be used for all cameras that are sufficiently similar, e.g. all cameras of the same production series. It is understood that the concept of this general calibration greatly facilitates the calibration of the remaining cameras and reduces the time required.

Preferably, the calibration comprises determining the second function $f$ by performing the following steps, which are not necessarily performed in the order in which they are described here:

A plurality of different depth measurements are performed with the camera, each measurement providing a raw depth value $r_m(k)$ for each of a plurality of pixels in an area of interest, wherein k=1, . . . , N is the number of the individual depth measurement. In other words, N different depth measurements are performed, which means that the three-dimensional scenery recorded by the camera is different for each depth measurement from the point of view of the camera. One example for a simple setup would be to position the camera facing a plane surface and to change the distance between the camera and the surface for each depth measurement. A raw depth value $r_m(k)$ is acquired for each of a plurality of pixels in an area of interest. The area of interest may comprise the centre of the sensor array and it may have a square shape. However, it could be positioned off-centre and could have a different, even irregular or non-coherent shape. Preferably, the area of interest corresponds to a portion of the sensor array. In particular, it can be considerably smaller than the sensor array, e.g. it may comprise less than 10% of the sensor array or even less than 1% of the sensor array. It is understood that this greatly facilitates the calibration. For each depth measurement and for each pixel, the raw depth value $r_m(k)$ is stored in a memory of the camera or an external memory.

Furthermore, a ground truth value $r_t(k)$ is determined for each depth measurement and for each pixel in the area of interest. This ground truth value $r_t(k)$ represents the actual, physical distance between the respective pixel and the point from where the light received by this pixel is reflected. This distance could be measured by any sufficiently accurate means known in the art or it could be deduced from the position of the camera with respect to the recorded object(s). This ground truth value $r_t(k)$ is used as an objective reference for the calibration.

In another step, possibly before acquiring the raw depth values $r_m(k)$ and/or the ground truth values $r_t(k)$, the second offset $c_t$ is defined. In this context, the second offset $c_t$ may be chosen arbitrarily.

According to yet another step, for each pixel in the area of interest, a pixel-dependent third function $f_p$ with at least one parameter is defined and the at least one parameter is fitted to the following condition:

$$r_m(k) = c_m + f_p(r_t(k) - c_t). \quad \text{(eq. 5)}$$

Ideally, the number of depth measurements corresponds to the number of parameters, so that eq. 5 can be fulfilled for all k. If the number of depth measurements is greater than the number of parameters, eq. 5 can normally not be fulfilled for all k and fitting methods known in the art can be applied e.g. in order to minimise the mean square error. Normally, the number of parameters should be less or equal to the number of depth measurements. It should be noted that the memory space required for the third function $f_p$ can be comparatively small because the area of interest is normally only a small portion of the sensor array. The third function $f_p$ for each pixel in the area of interest can be stored either explicitly, e.g. in the form of a look-up table, or by storing the at least one parameter acquired by the fitting procedure.

When the third functions have been determined, the second function $f$ is determined based on the third functions $f_p$ of a plurality of pixels in the area of interest. Normally, it is determined based on all pixels in the area of interest, although it is conceivable that for some reason some of the pixels could be neglected or discarded. Normally, the second function $f$ and the third functions $f_p$ have a similar form and may only differ by certain parameters. For example, if the second function $f$ has the form given by eq. 4, the third functions $f_p$ are normally chosen to have the same form.

There are various ways how the second function $f$ could be determined based on the third functions $f_p$. In general, some kind of averaging can be applied. In particular, the second function $f$ can be determined by averaging the at least one parameter of the third functions $f_p$ over a plurality of pixels in the area of interest. Normally, averaging is performed over all pixels in the area of interest. In general, a specific parameter of the respective third function $f_p$ has different values for different pixels. By taking the average of each parameter over a plurality of pixels, a second function $f$ can be determined that is pixel-independent. It should be borne in mind that the pixelwise distance-independent deviations from the second function $f$ are not lost, but they are incorporated exclusively in the first offset $c_m$. When here and in the following is made reference to "averaging", this normally refers to the arithmetic mean. However, it could also refer to other types of averaging, for example a weighted average.

There are, however, alternatives to defining pixel-dependent third functions $f_p$ and calculating the second function $f$ based thereon. Namely, the raw depth values $r_m(k)$ and the ground truth values $r_t(k)$ of all pixels in the area of interest can be considered collectively. For example, one could consider a condition similar to (eq. 5), in which the sum is taken over all pixels and the pixel-dependent third functions $f_p$ are replaced by the pixel-independent second function $f$:

$$\Sigma r_m(k) = C_m + \Sigma f(r_t(k) - c_t) \quad (\text{eq. 5a})$$

where $C_m$ is a parameter corresponding to the sum of $c_m$ over all pixels. The second function $f$ comprises at least one parameter which is fitted to fulfil eq. 5a. Of course eq. 5a could be divided by the number of pixels in the area of interest to get an average, thereby taking an arithmetic mean over all pixels. Apart from taking the arithmetic mean, a different kind of averaging could be performed, e.g. a weighted averaging. Yet another option is to simply fit the parameters of second function $f$ according to the following condition:

$$r_m(k) = c_m + f(r_t(k) - c_t) \quad (\text{eq. 5b})$$

wherein the fitting process is performed taking into account the raw depth values $r_m(k)$ and the ground truth values $r_t(k)$ of all pixels from all depth measurements. Irrespective of whether the second function $f$ is determined directly as described here or via the third functions $f_p$ as described above, the first offset $c_m$ can be determined as described below.

According to a preferred embodiment, the calibration comprises, for each pixel in the area of interest and each depth measurement, calculating an offset estimate $c_m(k)$ for the first offset $c_m$ according to the following equation:

$$c_m(k) = r_m(k) - f(r_t(k) - c_t) \quad (\text{eq. 6})$$

The offset estimate $c_m(k)$ is related to the first offset $c_m$ and may in some cases even be identical. However, the offset estimate $c_m(k)$ is generally different for each depth measurement. In other words, while the first offset $c_m$ only depends on the pixel, the offset estimate $c_m(k)$ also depends on the individual depth measurement.

While the offset estimates $c_m(k)$ for the individual depth measurements form the basis for determining the first offset $c_m$, there are various ways conceivable how the first offset $c_m$ could be determined. For instance, one of the offset estimates $c_m(k)$ could be chosen by some criteria to be the first offset $c_m$, while the other offset estimates are discarded. Preferably, the first offset $c_m$ is determined by averaging the offset estimate $c_m(k)$ over a plurality of depth measurements. Normally, the average is taken over all depth measurements. As mentioned above, this averaging normally refers to taking the arithmetic mean, but it could be a different average.

As mentioned above, the first function $g$ and the first offset $c_m$ can be determined in a general calibration that is valid for a plurality of cameras, e.g. for all cameras of a given type or production series. The second offset $c_t$, though, is usually specific for a given camera. In one embodiment of the invention, the calibration comprises using the first function $g$ and the first offset $c_m$ determined in a general calibration with one camera and performing an individual calibration for a different camera. In other words, the first function $g$ and the first offset $c_m$ have been determined using one camera and this calibration only has to be performed once, whereafter the first function $g$ and the first offset $c_m$ can be used for all cameras that are sufficiently similar, e.g. all cameras of the same type. These cameras are of course different from the camera used for the general calibration. In the individual calibration, a depth measurement is performed for at least one pixel to obtain a raw depth value $r_m$. Further, a ground truth value $r_t$ for the at least one pixel is determined. The ground truth value $r_t$ is not determined by the camera, but by some other means, i.e. independently of the camera. Finally, the second offset $c_t$ is calculated according to:

$$c_t = r_t - g(r_m - c_m). \quad (\text{eq. 7})$$

It is understood that if the raw depth value $r_m$ and the ground truth value $r_t$ are determined for a plurality of pixels, the above equation generally yields a different second offset $c_t$ for each pixel. In order to obtain a single value as required, averaging may be performed over the second offsets $c_t$ of all pixels.

Depending on the application, it may be sufficient to consider the second offset $c_t$ to be a constant that only depends on the individual camera sample. However, it is usually more realistic to assume that the second offset $c_t$ is temperature-dependent. While the actual temperature dependency may be complicated, it may be approximated, at least for a realistic temperature range, e.g. by a linear relation like $c_t(T) = c_t(T_0) + b(T-T_0)$. If necessary, quadratic or higher-order terms could be included. Alternatively, the temperature dependency could be represented by a look-up table. In general, the temperature dependency of the second offset may be represented by:

$$c_t = c_t(T_0) + b(T-T_0) + c(T-T_0)^2 + \ldots = c_{t0} + c_{t1}(T) \quad (\text{eq. 8})$$

where $c_{t0} = c_t(T_0)$ is a temperature-independent constant and $c_{t1}(T)$ represents all temperature-dependent terms, i.e. linear and possible higher order terms. It should be noted that the temperature $T$ is normally not the external temperature around the TOF camera but the temperature of an internal component like the light emitter(s) of the camera. This temperature generally depends on whether the camera is heated up or not, regardless of the external temperature.

If the temperature dependency of the second offset $c_t$ is taken into account, the calibration may comprise determining the second offset $c_t$ for a first temperature and, for each of at least one second temperature, performing the following steps (which correspond to the determining of the second offset in the individual calibration). In a first step, a depth measurement is performed for at least one pixel to obtain a raw depth value $r_m$. In another step, a ground truth value $r_t$ is determined for the at least one pixel. With the raw depth value $r_m$ and the ground truth value $r_t$ determined, the second offset $c_t$ for the respective temperature is calculated according to $c_t = r_t - g(r_m - c_m)$. When these steps have been performed, at least one parameter related to a temperature dependency of the second offset $c_t$ is determined. Each temperature normally yields a different value for the second offset $c_t$. Each of these values could simply be stored in a look-up table and values for intermediate temperatures could be interpolated. Alternatively, the temperature dependency could be modeled as a function that is e.g. linear, quadratic or higher order with respect to the temperature (as represented by eq. 8). The parameters for the constant, linear, quadratic and other terms in this function can then be fitted according to the respective values determined at different temperatures.

It is highly preferred that the abovementioned steps are only performed in the general calibration, i.e. only once for a plurality of cameras. In this case, determining the second offset $c_t$ for the first temperature may correspond to defining the second offset as described above. If the temperature dependency of second offset $c_t$ is taken into account, the first temperature, for which the second offset $c_t$ is defined, needs to be determined and has to be stored for further reference. If performed as part of the general calibration, the above described process may also be referred to as a general temperature calibration.

It has been found that it is a reasonable approximation to assume that the temperature dependency of all cameras of a certain production series or type differ only by a constant offset e.g. $c_t(T_0)$. Therefore, if the temperature dependency of the second offset $c_t$ is taken into account, it is sufficient that the temperature is maintained constant in the individual calibration and the second offset of the individual calibration is used as $c_t(T_0)$ (or used to determine $c_t(T_0)$, if the temperature during individual calibration differs from $T_0$). Either way, even with a temperature-dependent second offset $c_t$, a single depth measurement in the individual calibration is sufficient to determine the second offset $c_t$. This greatly facilitates the calibration process, because the temperature calibration is split up into a general temperature calibration, which may be performed for a plurality of temperatures and that has to be done only once for each camera production series or type, and an individual calibration for each camera that has to be performed only for a single temperature. With regard to eq. 8, one could say that the temperature-dependent part $c_{t1}(T)$, which may also be referred to as the device-independent part, is only determined once during general temperature calibration, while the temperature-independent part $c_{t0}$, which may also be referred to as the device-dependent part, is determined in the individual calibration.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
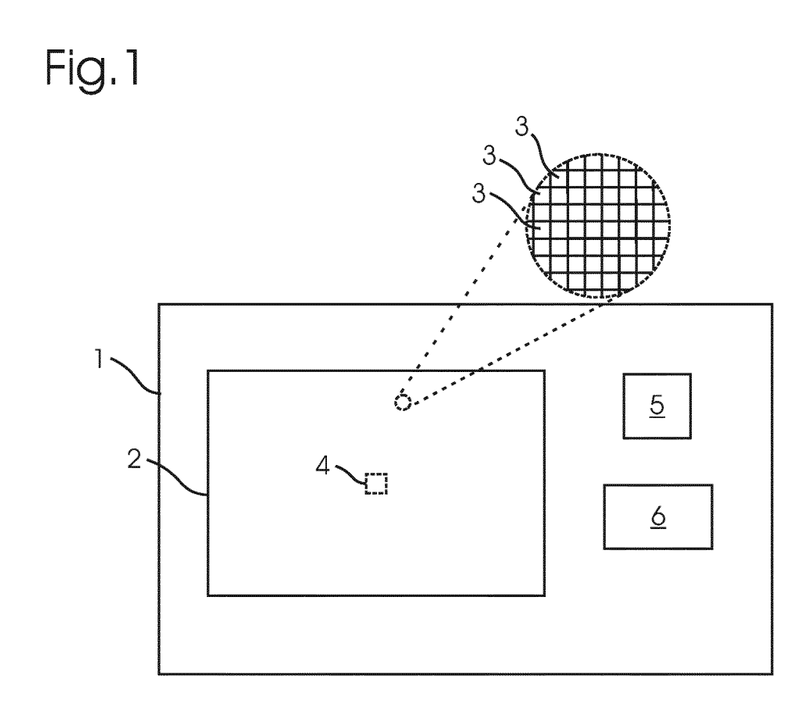
FIG. 1 is a schematic view of a TOF camera that can be used for the inventive method.

FIG. 1 schematically shows a ToF camera 1 that is adapted for depth measurement using amplitude-modulated continuous light. It comprises a rectangular sensor array 2 with a plurality (e.g. several thousand or several ten thousand) of pixels 3. Furthermore, it comprises a memory 5 and a processing unit 6. The camera 1 is configured to emit amplitude-modulated continuous light using one or several light emitters, which are not shown here for sake of simplicity. The light is reflected by a 3D object or scenery in a field of view of the camera 1 and the reflected light is received by the pixels 3 of the sensor array 2. The amplitude of the received light is sampled at a frequency four times higher than a modulation frequency of the light. In other words, four amplitudes $A_{0...3}$, also referred to as taps, are used to retrieve the phase $\varphi$ of the modulated light, since $$\varphi = \operatorname{atan}\left(\frac{A_0 - A_2}{A_1 - A_3}\right). \quad \text{(eq. 2)}$$

Since the sampling frequency is four times higher than the fundamental modulation frequency, according to the Shannon-Nyquist theorem, aliasing can occur for harmonics with an order greater than two. When a certain raw depth value $r_m$ is measured for one of the pixels 3, this aliasing, along with other effects, generally leads to a deviation from a ground truth value $r_t$. This deviation is corrected according to an inventive method which will now be described with reference to the flowchart in FIG. 2.

Figure 2:
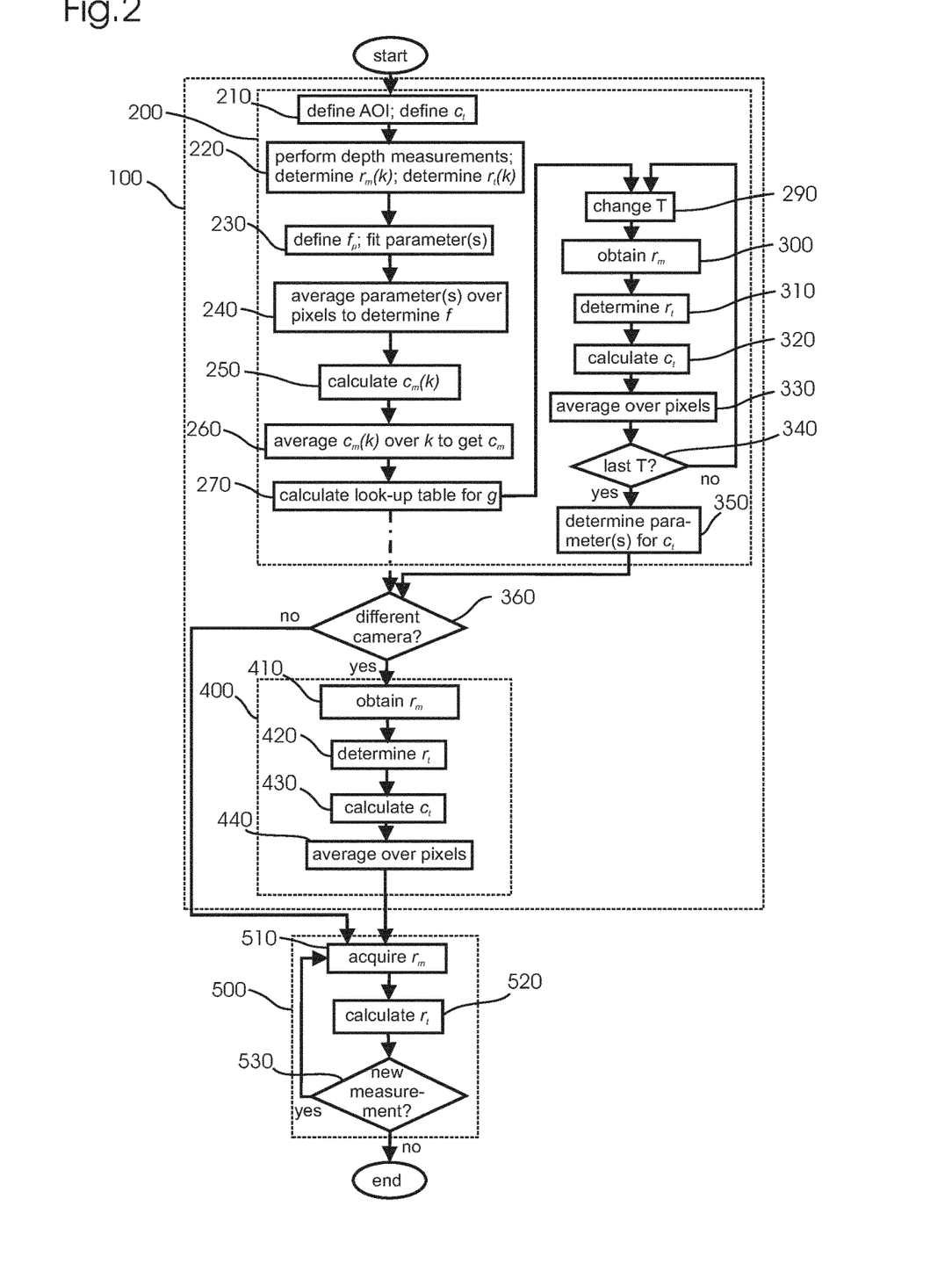
FIG. 2 is a flowchart illustrating an embodiment of the inventive method.

According to the inventive method, the relation between the raw depth value $r_m$ and the ground truth value $r_t$ is given by $$r_m = c_m + f(r_t - c_t), \quad \text{(eq. 3)}$$

in this case, the second function $f$ is modeled as:

$$f(r) = a_0 + r + b_1 \cos(k_4 r + \theta_1) + b_2 \cos(k_8 r + \theta_2) + \ldots \quad \text{(eq. 4)}$$

(eq. 3) can be rewritten as follows:

$$r_t = g(r_m - c_m) + c_t \quad \text{(eq. 1)}$$

so that the ground truth value $r_t$ can be calculated from the raw depth value $r_m$. However, before this correction can be applied in a corrected depth measurement 500, the first function $g$ as well as the first and second offset $c_m$, $c_t$ need to be determined in a calibration 100. The calibration 100 comprises a general calibration 200 that needs to be carried out for only one camera 1 of a given production series, which may be referred to as a "golden sample". This general calibration 200 yields a first function $g$ and a first offset $c_m$ that can be used for all cameras 1 of this production series. Furthermore, it yields a second offset $c_t$ with a sample-independent part $c_{t1}(T)$ that can be used for all cameras 1 of the production series.

In a first step, at 210, an area of interest 4 comprising a plurality of pixels 3 is defined on the sensor array 2. In this example, the area of interest 4 is rectangular and centred with respect to the sensor array 2, but it could have a different shape and/or location. The area of interest 4 represents only a small portion of the sensor array 2 and comprises e.g. between 10 and 20 pixels. Also, the second offset $c_t$ is defined, i.e. it is chosen arbitrarily.

In another step, at 220, a plurality of different depth measurements are performed. For example, the camera 1 could be positioned opposite a flat surface and the distance could be increased between consecutive depth measurements. If a temperature dependency of the second offset $c_t$ is taken into account—which is normally the case—, the temperature has to be maintained constant until the depth measurements have been performed. Also, the temperature has to be determined, e.g. measured. In each depth measurement, a raw depth value $r_m(k)$ and a ground truth value $r_t(k)$ are determined for each pixel 3 in the area of interest 4. The raw depth value $r_m(k)$ is determined by the camera 1, while the ground truth value $r_t(k)$ is measured and/or calculated independently of the camera 1. All quantities mentioned here and in the following can be stored in the memory 5 of the camera 1 while all necessary calculations can be performed by the processing unit 6.

In a next step, at 230, several pixel-dependent third functions $f_p$ are defined, which have a similar form as the first function $f$ and comprise corresponding parameters. Using the previously determined raw depth values $r_m(k)$ and ground truth values $r_t(k)$ for the respective pixel 3, the parameters of the individual third function $f_p$ are fitted to fulfill the condition $$r_m(k)=c_m+f_p(r_t(k)-c_t) \quad \text{(eq. 5)}$$

for all depth measurements. This yields a plurality of third functions $f_p$, namely one for each pixel 3 in the area of interest 4, which are generally pairwise different.

At 240, the parameters of the individual third functions $f_p$ are averaged over all pixels 3 in the area of interest 4 in order to obtain the parameters for the second function $f$, which is now pixel-independent. As an alternative to defining and determining individual third functions $f_p$ as in step 230, the second function $f$ could be directly determined based on the raw depth values $r_m(k)$ and ground truth values $r_t(k)$ of all pixels (3). In this case, step 240, would be obsolete.

In another step at 250, an offset estimate $c_m(k)$ is calculated for every pixel 3 of the sensor array 2 and for each depth measurement by $$c_m(k)=r_m(k)-f(r_t(k)-c_t) \quad \text{(eq. 6)}$$

and at 260, the average of all offset estimates is taken over the depth measurements to obtain the first offset $c_m$ for the individual pixel 3.

With the second function $f$ known, its inverse function, namely the first function g, can be determined. This is done at 270 by calculating a look-up table for the first function g. Therefore, a set of theoretical values $r'_t(k)=ku$, $k=0, \ldots, N-1$ for the ground truth depth is defined with a chosen resolution u in the unambiguity range of the camera 1, e.g. $u=1$ mm, $k=0, \ldots, 7500$. If the function values of $r'_t(k)$ for the second function $f$ are also defined with respect to the resolution u, i.e. $r'_m=f(r'_t)=f(ku)=lu$, the inverse function $r'_t=g(r'_m)$ can be expressed as $r'_t=ku=g(r'_m)=g(lu)=\text{LUT}(l)u$. The look-up table is determined in a simple iterative algorithm.

If the temperature dependency of the second offset $c_t$ can be neglected, the general calibration 200 ends with this step and the method continues at 360, as indicated by the dash-dotted arrow. Normally though, the second offset $c_t$ has to be treated as temperature-dependent, and the general calibration 200 continues with at least one second temperature that is different from the temperature of the previous measurements. The temperature dependency of the second offset $c_t$ can be represented by a function having several parameters. For example, the temperature dependency can be assumed to be linear, wherefore the respective function has two parameters. In order to determine the parameters, one needs at least the same number of values for the second offset $c_t$, one of which has already been defined previously. In general, the temperature dependency of the second offset may be represented by:

$$c_t=c_t(T_0)+b(T-T_0)+c(T-T_0)^2+\ldots=c_{t0}+c_{t1}(T) \quad \text{(eq. 8)}$$

where $c_{t0}=c_t(T_0)$ is a temperature-independent constant and $c_{t1}(T)$ represents all temperature-dependent terms, i.e. linear and possible higher order terms. At 290, the temperature is changed. Another depth measurement is performed to obtain a raw depth value $r_m$ for at least one pixel 3, preferably a plurality of pixels 3, at 300. For instance, this could be all pixels 3 in the area of interest 4. Likewise, at 310, a ground truth value $r_t$ is determined for each pixel 3. At 320, the second offset $c_t$ is calculated for every pixel 3. If more than one pixel 3 has been taken into account, the average over all pixels 3 is taken at 330 to determine the final value for the second offset $c_t$. If it is decided at 340 that the second offset $c_t$ has to be determined for another second temperature, the temperature is changed again at 290 and the following steps are repeated. If the measurement has been performed for all second temperatures, at least one parameter defining the temperature dependency of the second offset $c_t$ is determined at 350, and the general calibration 200 ends.

As mentioned above, the results of the general calibration 200 can not only be used for a single camera 1, but for all cameras 1 of the same production series. If a different camera 1 (i.e. different from the camera 1 used in the general calibration 200) needs to be calibrated, which is checked at 360, the method continues with an individual calibration 400. In this individual calibration 400, another depth measurement is performed to obtain a raw depth value $r_m$ for at least one pixel 3, preferably a plurality of pixels 3, at 410. For instance, this could be all pixels 3 in the area of interest 4. Likewise, at 420, a ground truth value $r_t$ is determined for each pixel 3. At 430, the second offset $c_t$ is calculated for every pixel 3. If more than one pixel 3 has been taken into account, the average over all pixels 3 is taken at 440 to determine the final value for the second offset $c_t$.

If, as is normally the case, the second offset $c_t$ is represented not only by a temperature-independent constant $c_{t0}$ but also by a temperature-dependent part $c_{t1}(T)$, it can be assumed that the temperature dependency for this camera differs from the "golden sample" only by a constant offset, i.e. the temperature-independent constant $c_{t0}$ is device-dependent and generally different for each camera, but the temperature-dependent part $c_{t1}(T)$ is device-independent. Therefore, it is sufficient to compare the value for the second offset $c_t$ determined for the temperature of the individual calibration 400 with the value that would have been valid for the "golden sample" and shift the entire function by the difference (if present). In other words, only the temperature-independent constant $c_{t0}$ of the temperature-dependent function has to be determined or "updated", while the temperature-dependent part $c_{t1}(T)$, e.g. linear or quadratic terms, can be left unchanged. Therefore, even if the second offset $c_t$ is temperature-dependent, the individual calibration 400 can be carried out with a single depth measurement. Since the temperature does not change (in any significant way) during a single depth measurement, no problems arise with maintaining a constant temperature during the individual calibration 400.

When the calibration 100 has been completed, the actual corrected depth measurement 500 can begin. At 510, raw depth values $r_m$ are acquired for all pixels 3 of the sensor array 2 and at 520, the corresponding ground truth values $r_t$ are calculated according to eq. 1. This can be repeated if a new corrected depth measurement is required at 530. If not, the method ends.

The invention claimed is:

1. A method for corrected depth measurement, the method comprising:
   acquiring, with a time-of-flight camera using amplitude-modulated continuous light, a raw depth value $r_m$ for each of a plurality of pixels of a sensor array of the camera; and
   automatically calculating for each of the plurality of pixels a ground truth value $r_t$ according to:

$$r_t=g(r_m-c_m)+c_t,$$

to correct a systematic depth error of the raw depth value $r_m$, wherein $c_m$ is a pixel-dependent first offset, g is a pixel-independent first function and $c_t$ is a pixel-independent second offset.

2. A method according to claim 1, wherein acquiring the raw depth value $r_m$ comprises determining four amplitude samples at a sampling frequency four times higher than a modulation frequency of the amplitude-modulated continuous light.

3. A method according to claim 1, wherein the first function g is applied by accessing a look-up table representing the first function g.

4. A method according to claim 3, wherein the look-up table is calculated by applying a second function $f$, which is the inverse function of the first function g.

5. A method according to claim 4, wherein the second function $f$ comprises a linear term, a third order harmonic term and a fifth order harmonic term with respect to the modulation frequency.

6. A method according to claim 1, wherein before the corrected depth measurement, a calibration is performed for the camera, in which at least one of the first offset $c_m$, the first function g and the second offset $c_t$ is determined.

7. A method according to claim 6, wherein in the calibration comprises a general calibration, in which at least one of the first offset $c_m$ and the first function g is determined only once for a plurality of cameras.

8. A method according to claim 6, wherein the first function g is applied by accessing a look-up table representing the first function g, the look-up table is calculated by applying a second function $f$, which is the inverse function of the first function g, and the calibration comprises determining the second function $f$ by:
performing with the camera a plurality of different depth measurements, each depth measurement providing a raw depth value $r_m(k)$ for each of a plurality of pixels in an area of interest, wherein k=1, ..., N is the number of the depth measurement;
for each depth measurement and for each pixel in the area of interest, determining a ground truth value $r_t(k)$;
defining the second offset $c_t$;
for each pixel in the area of interest, defining a pixel-dependent third function $f_p$ with at least one parameter and fitting the at least one parameter to the condition $r_m(k)=c_m+f_p(r_t(k)-c_t)$; and
determining the second function $f$ based on the third functions $f_p$ of a plurality of pixels in the area of interest.

9. A method according to claim 8, wherein the area of interest corresponds to a portion of the sensor array.

10. A method according to claim 8, wherein the second function $f$ is determined by averaging the at least one parameter of the third functions $f_p$ over a plurality of pixels in the area of interest.

11. A method according to claim 8, wherein the calibration comprises, for each pixel in the area of interest and each depth measurement, calculating an offset estimate $c_m(k)$ for the first offset $c_m$ according to $c_m(k)=r_m-f(r_t(k)-c_t)$.

12. A method according to claim 1, wherein the first offset $c_m$ is determined by averaging the offset estimate $c_m(k)$ over a plurality of depth measurements.

13. A method according to claim 6, wherein the calibration comprises using the first function g and the first offset $c_m$ determined in a general calibration with one camera and performing an individual calibration for a different camera by:
performing a depth measurement for at least one pixel to obtain a raw depth value $r_m$;
determining a ground truth value $r_t$ for the at least one pixel; and
calculating the second offset $c_t$ according to $c_t=r_t-g(r_m-c_m)$.

14. A method according to claim 1, wherein the second offset $c_t$ is temperature-dependent.

15. A method according to claim 6, wherein the calibration comprises determining the second offset $c_t$, for a first temperature and, for each of at least one second temperature:
performing a depth measurement for at least one pixel to obtain a raw depth value $r_m$;
determining a ground truth value $r_t$ for the at least one pixel; and
calculating the second offset $c_t$ for the respective second temperature according to $c_t=r_t-g(r_m-c_m)$;
and determining at least one parameter related to a temperature dependency of the second offset $c_t$.

16. A system for corrected depth measurement with a time-of-flight camera using amplitude-modulated continuous light, the system comprising:
a sensor array having a plurality of pixels;
processing circuitry, coupled to the sensor array, the processing circuitry being configured to carry out the steps of:
acquiring a raw depth value $r_m$ for each of the plurality of pixels of the sensor array; and
automatically calculating for each of the plurality of pixels a ground truth value $r_t$ according to:

$$r_t=g(r_m-c_m)+c_t,$$

to correct a systematic depth error of the raw depth value $r_m$, wherein $c_m$ is a pixel-dependent first offset, g is a pixel-independent first function and $c_t$ is a pixel-independent second offset.

17. A system according to claim 16, wherein acquiring the raw depth value $r_m$ comprises determining four amplitude samples at a sampling frequency four times higher than a modulation frequency of the amplitude-modulated continuous light.

18. A system according to claim 16, wherein before the corrected depth measurement, a calibration is performed for the camera, in which at least one of the first offset $c_m$, the first function g and the second offset $c_t$ is determined.

19. A system according to claim 18, wherein the first function g is applied by accessing a look-up table representing the first function g, the look-up table is calculated by applying a second function $f$, which is the inverse function of the first function g, and the calibration comprises determining the second function $f$ by:
performing with the camera a plurality of different depth measurements, each depth measurement providing a raw depth value $r_m(k)$ for each of a plurality of pixels in an area of interest, wherein k=1, ..., N is the number of the depth measurement;
for each depth measurement and for each pixel in the area of interest, determining a ground truth value $r_t(k)$;
defining the second offset $c_t$;
for each pixel in the area of interest, defining a pixel-dependent third function $f_p$ with at least one parameter and fitting the at least one parameter to the condition $r_m(k)=c_m+f_p(r_t(k)-c_t)$; and
determining the second function $f$ based on the third functions $f_p$ of a plurality of pixels in the area of interest.

20. A non-transitory computer program product stored on a computer-readable medium and comprising computerimplementable instructions which, when executed by a processor, cause the processor to carry out the method as claimed in claim 1.

\* \* \* \* \*